(12) United States Patent
Messerschmidt et al.

(10) Patent No.: US 10,989,325 B2
(45) Date of Patent: Apr. 27, 2021

(54) METHOD FOR PRODUCING AN ACTUATOR

(71) Applicant: BUERKERT WERKE GMBH & CO. KG, Ingelfingen (DE)

(72) Inventors: Andreas Messerschmidt, Ingelfingen (DE); Martin Rademaker, Bad Rappenau (DE); Wolfram Heiss, Pfedelbach (DE)

(73) Assignee: BÜRKERT WERKE GMBH & CO. KG

( * ) Notice: Subject to any disclaimer, the term of this patent is extended or adjusted under 35 U.S.C. 154(b) by 378 days.

(21) Appl. No.: 15/977,189

(22) Filed: May 11, 2018

(65) Prior Publication Data
US 2018/0259090 A1 Sep. 13, 2018

Related U.S. Application Data

(63) Continuation of application No. 15/089,933, filed on Apr. 4, 2016, now abandoned.

(30) Foreign Application Priority Data

Apr. 10, 2015 (DE) ...................... 10 2015 105 489.2

(51) Int. Cl.
*F16K 31/122* (2006.01)
*F16K 27/02* (2006.01)

(52) U.S. Cl.
CPC .......... *F16K 31/1221* (2013.01); *F16K 27/02* (2013.01); *F16K 27/0236* (2013.01)

(58) Field of Classification Search
CPC ........ F16K 31/12; F16K 31/122; F16K 27/00; F16K 27/12

(Continued)

(56) References Cited

U.S. PATENT DOCUMENTS 3,066,631 A * 12/1962 Geary .................... B21D 53/86
29/463
3,290,003 A * 12/1966 Kessler .................. F16K 27/08
251/318

(Continued)

FOREIGN PATENT DOCUMENTS

CN 101509570 A 8/2009
CN 201348080 Y 11/2009

(Continued)

OTHER PUBLICATIONS

German Search Report dated Jan. 22, 2016 from corresponding DE Application No. 102015105489.2 along with unofficial English translation, 8 pages.

*Primary Examiner* — Christopher M Koehler
(74) *Attorney, Agent, or Firm* — Dilworth IP, LLC

(57) ABSTRACT

An method for producing an actuator comprising an outer housing which includes at least one first housing part and one second housing part, wherein the first housing part has an inner side with a running surface for a hydraulically or pneumatically drivable piston coupled with a valve tappet and has a circumferential rim, wherein the second housing part comprises a circumferential centering collar having a radial outside, comprises the steps of producing the first housing part by plastically deformation of a metal part due to exertion of outer pressure, and attaching the first housing part to the second housing part by mounting the circumferential rim onto the outside of the circumferential centering collar.

17 Claims, 4 Drawing Sheets

(58) Field of Classification Search
USPC ........ 29/890.12, 890.124, 890.125, 890.126, 29/890.13
See application file for complete search history.

(56) References Cited

U.S. PATENT DOCUMENTS

| | | | | |
|---|---|---|---|---|
| 3,327,900 | A | * | 6/1967 | Goda ................ B01L 3/0206 222/43 |
| 3,681,960 | A | * | 8/1972 | Tadokoro ............ B21D 26/043 72/61 |
| 4,199,131 | A | | 4/1980 | Boski et al. |
| 4,582,082 | A | | 4/1986 | Tosseghini |
| 5,680,703 | A | * | 10/1997 | Ono ................... B23P 11/005 137/15.19 |
| 6,006,431 | A | * | 12/1999 | Dorner ............... B23P 15/001 29/890.126 |
| 6,041,804 | A | * | 3/2000 | Chatufale ............. E21B 34/04 137/15.23 |
| 8,245,402 | B2 | * | 8/2012 | Seitter ................ F02M 61/168 29/890.131 |
| 8,667,887 | B2 | | 3/2014 | Wiedenmann et al. |
| 8,763,626 | B2 | | 7/2014 | Cuvelier et al. |
| 8,915,483 | B2 | | 12/2014 | Andersen et al. |
| 2015/0198186 | A1 | * | 7/2015 | McEvoy, Jr. ......... F15B 15/149 251/25 |

FOREIGN PATENT DOCUMENTS

| | | |
|---|---|---|
| CN | 102109054 A | 6/2011 |
| CN | 102192211 A | 9/2011 |
| CN | 102933885 A | 2/2013 |
| CN | 203272869 U | 11/2013 |
| DE | 19713313 B4 | 10/2005 |
| WO | 2011110351 A1 | 9/2011 |

* cited by examiner

METHOD FOR PRODUCING AN ACTUATOR

FIELD OF THE INVENTION

This invention relates to a method for producing an actuator, in particular a valve drive.

BACKGROUND

Such actuators drive a valve tappet which then in turn leads to closing of a valve seat, in that either itself or a part coupled with the same, for example a diaphragm, presses against a valve seat. The pneumatic or hydraulic valve drives to which the present invention relates have multipart outer housings, in particular two-part outer housings with a lid-shaped upper part and an attached, in particular cast lower part. Depending on the axial overall height of the upper part or the lower part, the piston either internally runs on a corresponding running surface on the upper part or on the lower part or on a separate insert. For the tightness of the two chambers of the piston space separated by the piston, it is of course important that the running surface preferably is designed cylindrical, in particular circular cylindrical, and uniform. Correspondingly, the running surface is turned or ground.

To maintain the stability of the respective housing part provided with the running surface during a machining operation, the stabler one of the two housing parts usually also is the machined housing part provided with the running surface. This mostly is a cast part on which a thin lid then is mounted, which forms the other housing part and which seals the piston space.

It is the object of the invention to create a method for producing an actuator at low costs and which is characterized by a high precision of the running surface.

SUMMARY

The present invention provides a method for producing an actuator comprising an outer housing which includes at least one first housing part and one second housing part, wherein the first housing part has an inner side with a running surface for a hydraulically or pneumatically drivable piston coupled with a valve tappet and has a circumferential rim, wherein the second housing part comprises a circumferential centering collar having a radial outside, comprises the steps of producing the first housing part by plastically deformation of a metal part due to exertion of outer pressure, and attaching the first housing part to the second housing part by mounting the circumferential rim onto the outside of the circumferential centering collar.

The idea underlying the present invention consists in using a relatively thin-walled first housing part which is obtained by metal forming (more particular chipless metal forming) where a metal is deformed by outer pressure, for example by deep drawing or internal high-pressure forming. The roundness of the running surface is ensured in that the first housing part is mounted onto a circumferential centering collar of the second housing part, so that the first housing part receives its circular shape by the second housing part, so to speak. This provides for designing the first housing part with a small wall thickness and possibly in addition, according to an embodiment which will yet be explained below, at the same time leave the running surface unmachined.

The second housing part preferably is a cast part. The centering collar, i.e. the contact surface with the first housing part, can be machined to achieve an optimum roundness, in case the manufacturing tolerances are not sufficient during casting.

The actuator produced by the method according to the invention in particular has a two-part outer housing which is composed of exactly two housing parts.

The first housing part has a circumferential wall which terminates with the circumferential rim and which has a smaller radial bending stiffness than the second housing part in the region of the centering collar, in order to ensure from the outset that the geometry and the roundness in the region of the running surface at least also is determined by the centering collar.

The running surface in particular is a surface unmachined after forming, i.e. no material removal is effected, either mechanically or chemically or electrochemically. Thus, the bare formed wall becomes the running surface on the inside.

The wall thickness of the first housing part in the region of the running surface preferably is between 0.8 and 2 mm or preferably 1 to 5% of the outside diameter of the first housing part in the region of the running surface.

In the region of the circumferential rim, i.e. in the region adjoining the circumferential rim, the first housing part has a circumferential flare. This flare has various advantages. Since the piston, in particular the piston along with its elastic seal, must be inserted into the first housing part, the piston or its piston sealing ring easily can be damaged due to a sharp-edged circumferential rim. So far, special mounting devices in the form of funnel-shaped insertion parts are used for this purpose. This special assembly is not necessary with the flare, as in the region of the circumferential rim itself the first housing part flares towards its opening, so that the piston can be pushed in very easily and safely.

The flare for example should amount to between 0.01 and 20%, preferably between 1 and 4% of the outside diameter of the first housing part in the region of the running surface.

The flare is made by plastic forming before mounting onto the first housing part.

At the second housing part an axial stop can be provided for the circumferential rim, in order to facilitate pressing together of the housing parts with respect to the axial positions of the parts relative to each other. One possibility consists in that the centering collar ends with a shoulder protruding radially to the outside.

The first housing part can be seated on the circumferential rim without clearance, in particular by means of a press fit.

The running surface in particular directly adjoins the centering collar.

The second housing part can have a guiding dome for the valve tappet extending into the housing interior as well as a stop for the piston, which in particular is formed by the end face of the guiding dome.

Alternatively or in addition to the press fit the first and the second housing part can be welded, soldered or glued to each other. Preferably, the two parts are pressure-tightly connected with each other.

The first housing part in particular is pot-shaped, i.e. it also has an end wall, in order to save components. The second housing part should be closer to the valve seat than the first housing part, i.e. the valve tappet leaves the outer housing in the region of the second housing part, in order to extend towards the valve body.

A simple embodiment of the invention consists in that the first housing part has a continuously constant wall thickness and/or the second housing part has a non-uniform wall thickness.

The first housing part and/or the second housing part can be made of stainless steel, so that the actuator in particular is usable in the food-processing and pharmaceutical industry.

The actuator produced by the method according to the invention in particular is a pneumatic actuator for driving a valve.

The end wall of the first housing part optionally can be provided with an opening into which a bearing part for the associated end of the valve tappet is inserted.

Furthermore, a connecting part for the hydraulic or pneumatic port can be inserted in the first housing part and be attached to the first housing part, in particular by welding, soldering or gluing. As such hydraulic or pneumatic port must have a certain stability, this separate use allows to employ a thin-walled first housing part, since the housing part itself need not provide the stability of the port and since the stability is ensured by the separately manufactured, inserted connecting part.

The lower housing part also preferably has a hydraulic or pneumatic port, which optionally however, when the second housing part is a cast part, is formed in the cast part without having to insert a separate part. However, this is not to be understood in a limiting sense, but merely is an option.

Another possibility to reduce the wall thickness of the first housing part consists in inserting a separately manufactured supporting element, for example in the form of a disk or a ring, into the first housing part in the region of the inside of the end wall. On this supporting part one or more pretensioning springs then can support, which urge the piston into a normal position. By this supporting element the spring force is uniformly distributed onto the thin-walled first housing part, which creates space for the connecting part protruding to the inside. The supporting part also serves to achieve the required overall height for pretensioning the springs. It would also be conceivable, for example, to omit the supporting element and render the first housing part lower as a whole.

DETAILED DESCRIPTION

Figure 1:
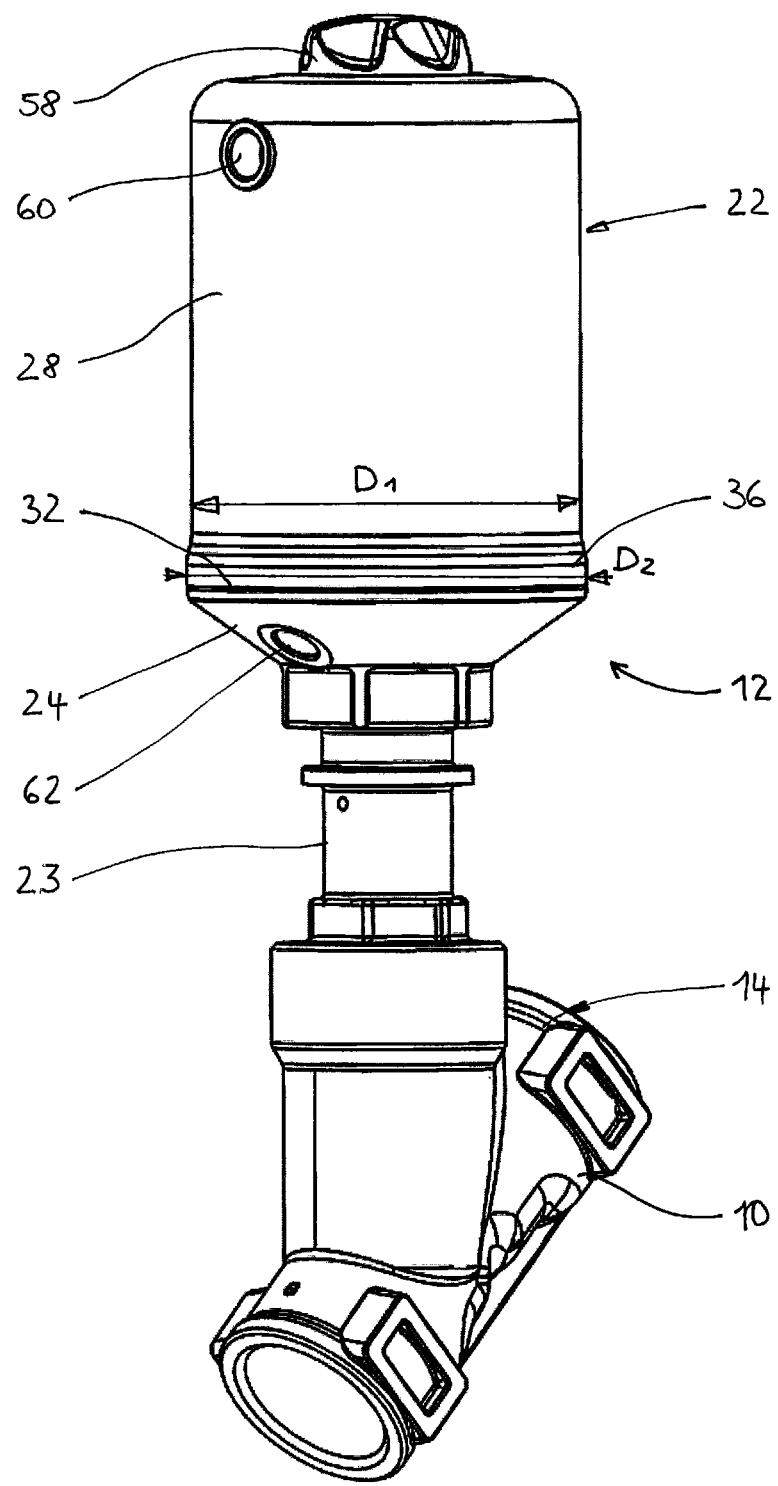
FIG. 1 shows a side view of an embodiment of a valve with an actuator produced by a method according to the invention.

FIG. 1 shows a valve with a valve body 10 and a pneumatic or hydraulic actuator 12 mounted on the valve body 10.

The valve body 10 for example has a flow passage 14 for gas or liquid, which can be opened and closed by a valve tappet 16 driven by the actuator 12, in that the valve tappet 16 itself or a closing body 18 connected therewith presses against a valve seat 20.

In the embodiment shown, the valve tappet 16 extends into the actuator 12, but in the alternative the valve tappet also can be constructed of several separate parts connectable with each other.

In the present case, the actuator 12 forms the so-called valve drive.

A shank 23 at the actuator 12 is inserted into a corresponding receptacle of the valve body 10 or, more generally, connected with the valve body 10 and is penetrated by the valve tappet 16.

The actuator 12 has an outer housing which substantially consists of a first housing part 22 which also is referred to as upper housing part and of a second housing part 24 which also is referred to as lower housing part.

The first housing part 22 is formed pot-shaped and is a formed part, in particular a deep-drawn part or internal high-pressure formed part, formed by forming a sheet metal, in particular a stainless steel sheet.

The second housing part 24 on the other hand preferably is a cast part of metal or plastics.

The pot-shaped first housing part 22 comprises an end wall 26 and a circular cylindrical circumferential wall 28.

The second housing part 24 pressure-tightly closes the open end of the first housing part 22 facing the valve body 10 and acts as second end wall for the outer housing. For this purpose, the first housing part 22 is provided with a circumferential rim 30 defining the free end, which sits on a shoulder of the second housing part 24, which forms the axial stop 32 for the first housing part 22.

Adjacent to the stop 32 a cylindrical ring-shaped, closed centering collar 34 is provided at the second housing part 24, onto which the first housing part 22 is pressed in the region adjacent to the circumferential rim 30.

The region of the first housing part 22 adjoining the circumferential rim 30 has a circumferential flare 36 which with its inside radially presses against the outside of the centering collar 34. The flare 36 is produced already during manufacture, i.e. when the first housing part 22 is formed, and not during pressing onto the second housing part 24. The first and the second housing part 22, 24 are connected with each other without clearance.

The tappet 16 is in drive connection with a piston 38 which in the present case is formed in two parts, for example, with an upper and a lower piston part 40, 42 which on the outside clamp a sealing ring 44 between themselves.

Both piston parts 40, 42 are formed hat-shaped and put into each other with a pot-shaped inner portion. The pot-shaped portion optionally can serve as guide and receptacle for a spring 46, wherein in the present case even two springs 46, 48 inserted into each other are provided, which pretension the piston 38 in direction of a normally closed valve position.

At their opposite end the springs 46, 48 abut against a supporting element 50 which on the inside flatly rests against the end wall 26.

The supporting element 50 has a plurality of ribs 52 extending in a star-shaped manner, for example, and a central sleeve-shaped portion 54 which acts as radial bearing for the valve tappet 16. In the present case, this is shown optionally, an attachment 56 is mounted at the upper end, which extends into the sleeve-shaped portion 54, in order to be guided laterally at the same.

At its upwardly protruding end, the sleeve-shaped portion 54 has a circumferential protruding rim with which it extends into an opening in the end wall 26 and is centered there. A transparent end cap 58 serves as inspection window, in order to optically display the position of the attachment 56 from above. Instead of the end cap, stroke limitations can also be incorporated.

In the region of the supporting element 50, the circumferential wall 28 has a lateral opening into which a separately manufactured connecting part 60 for a pneumatic or hydraulic port is inserted. The connecting part 60 is welded, soldered or glued to the circumferential wall 28.

In addition to the press fit, the first housing part 22 also is welded, soldered or glued to the second housing part 24.

A port 62 for pneumatic or hydraulic fluid provided on the opposite side of the piston 38 in the second housing part 24 allows to apply compressed fluid to the lower space delimited by the piston 38 or to let compressed fluid flow out.

The region along which the piston 38 with its seal 44 is moved forms a running surface 64 for the piston 38. This running surface 64 is remote from the flare 36, but directly adjoins the same. In the region of the running surface 64, preferably in the entire inner region, the first housing part 22 is unmachined after forming, i.e. no material removal has been effected.

Due to the fact that the wall of the first housing part 22 has a very small wall thickness, the pot-shaped first housing part 22 is relatively unstable, as regards the stability of its circular shape, before it is mounted onto the second housing part 24. The centering and the circular shape are optimized and/or secured by mounting onto the centering collar 34 of the second housing part 24. During mounting onto the centering collar 34 the circumferential wall experiences an elastic deformation in the region of the running surface, when the circumferential wall is not optimally circular cylindrical in the region of the running surface.

The first housing part 22 has a uniform wall thickness which lies in the range from 1 to 5% of the outside diameter D1 (see FIG. 1) of the first housing part 22 in the region of the running surface 64. The flare 36 amounts to between 0.01 and 20%, in particular between 1 and 4% of the outside diameter D1. The flare is determined by the diameter D2 in the region of the flare 36 and is determined by half the difference of D2 and D1, i.e. the flare a is (D2−D1)/2.

The embodiment according to FIGS. 3 and 4 corresponds to the one according to FIGS. 1 and 2, so that in the following exclusively the differences will have to be discussed.

Identical or functionally equivalent parts or portions bear the reference numerals introduced already.

Figure 3:
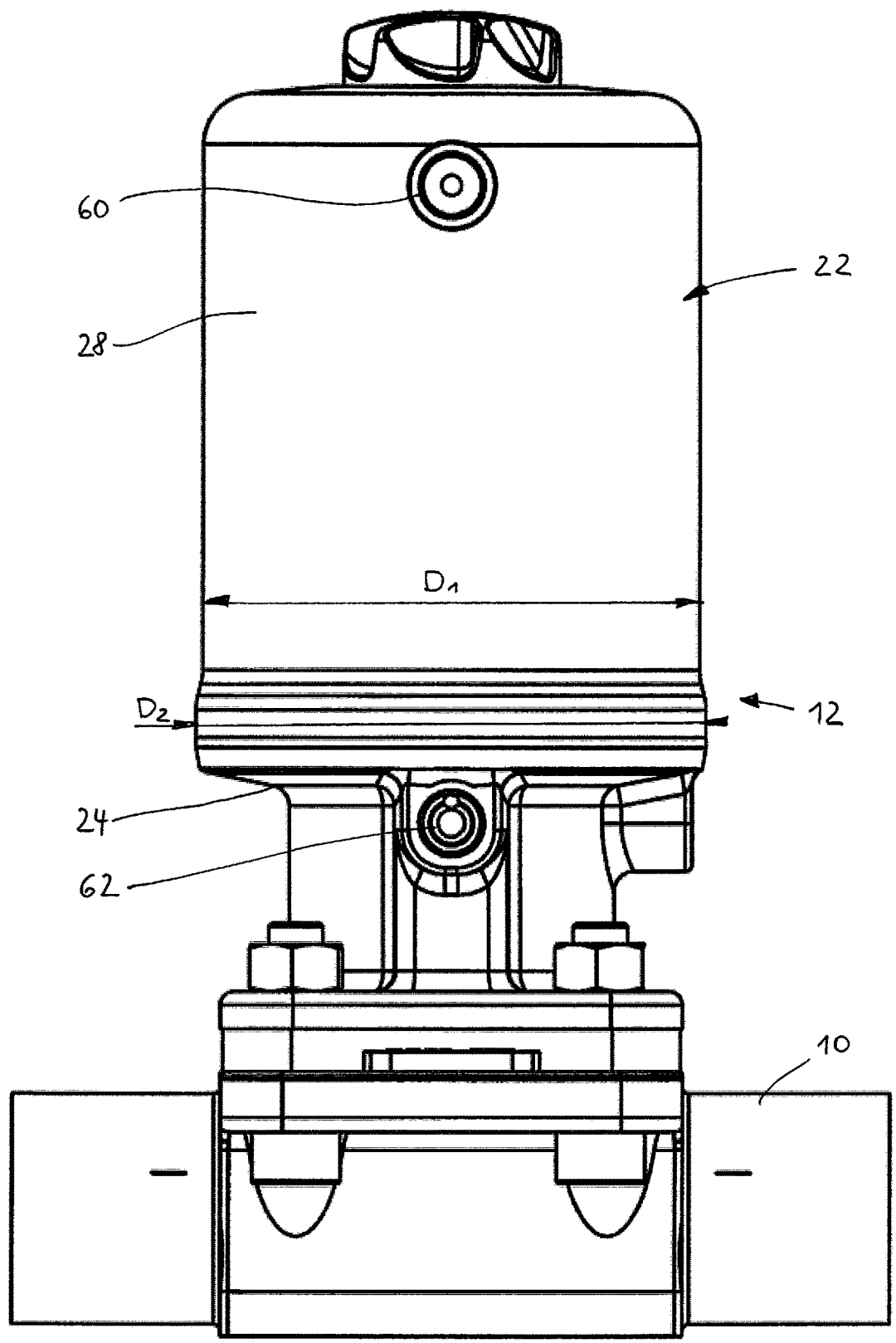
FIG. 3 shows a further valve with an actuator slightly modified with respect to the actuator according to FIGS. 1 and 2 which is produced by the method according to the present invention.
Figure 4:
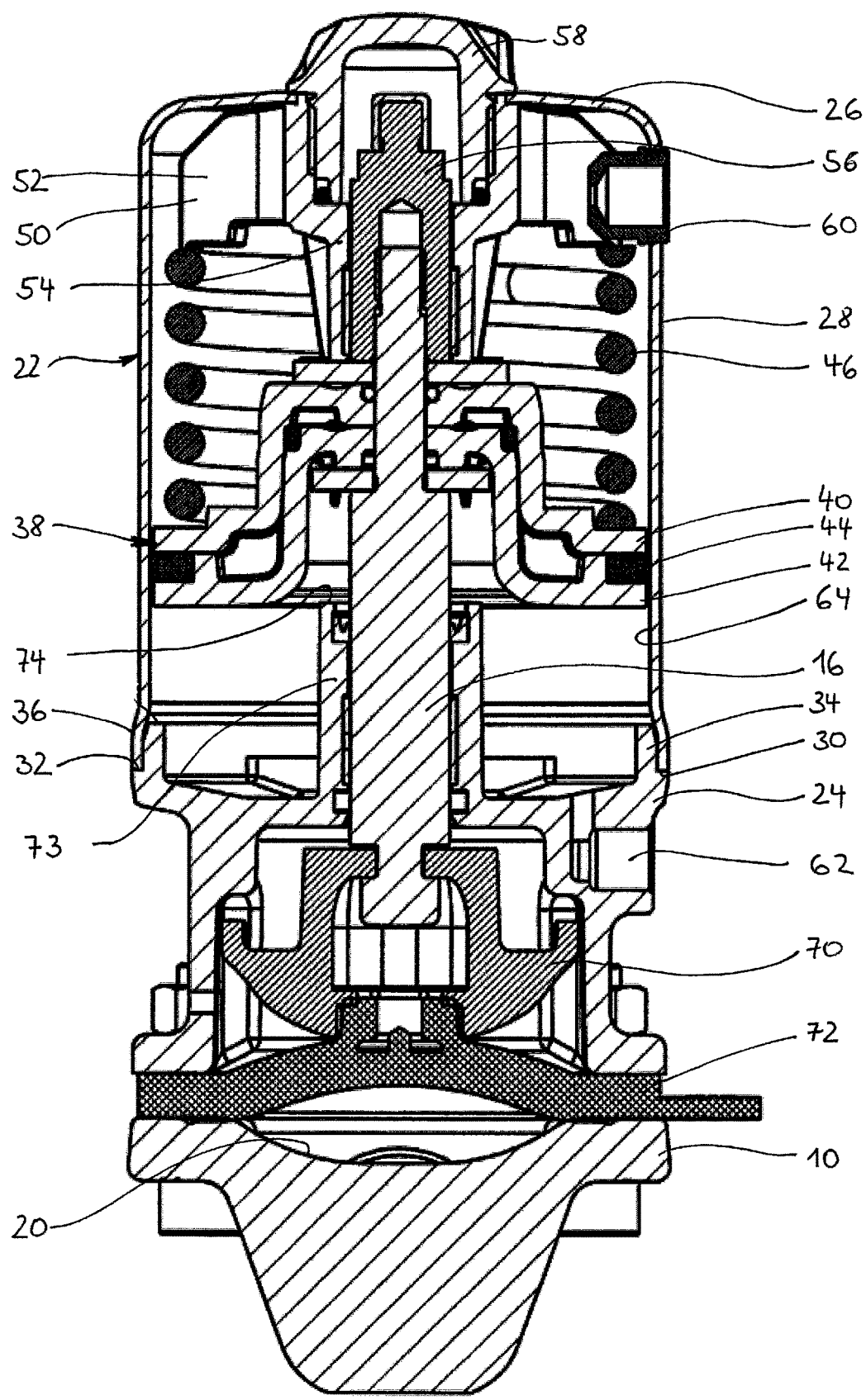
FIG. 4 shows a longitudinal sectional view through the valve of FIG. 3.

The valve shown in FIGS. 3 and 4 is a diaphragm valve, i.e. the tappet 16 is coupled with a diaphragm 72 via an intermediate piece 70 and moves said diaphragm upwards and downwards, in order to urge the same against a valve seat 20 or release the same with respect to said valve seat.

The diaphragm 72 is clamped between a valve body 10 and the second housing part 24, wherein here as well the first housing part 22 is mounted onto the second housing part 24 and connected with the same. The running surface 64 for the piston 38 also is unmachined here, and the first housing part 22 likewise is designed as formed part. In so far, all of this in detail functionally and constructively also corresponds to the first embodiment, so that details need not be discussed.

The wall thickness of the first housing part 22 in relation to the diameter D1 and the flare with the diameter D2 also lies within the ranges mentioned above.

Figure 2:
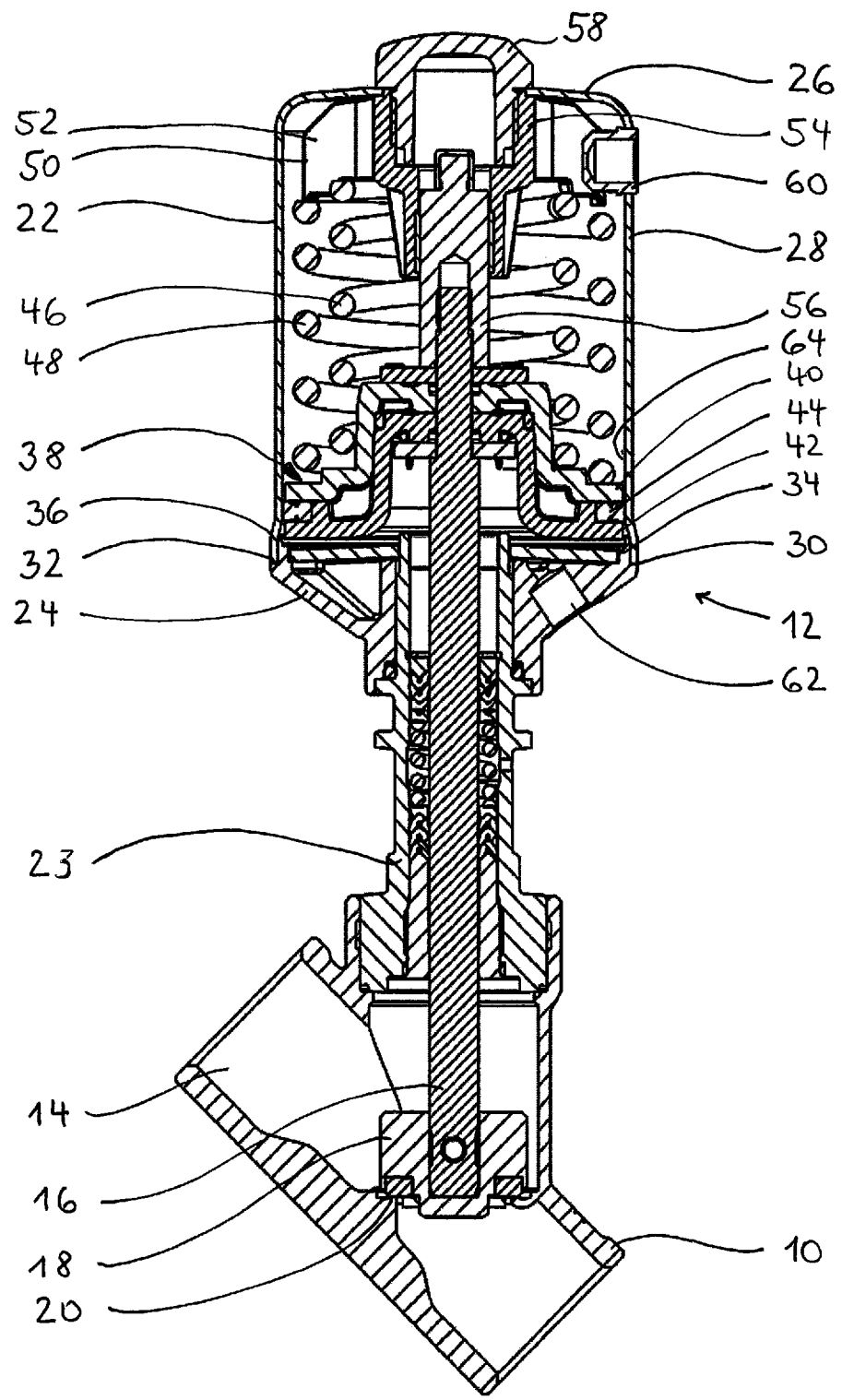
FIG. 2 shows a longitudinal sectional view through the valve of FIG. 1.

Better than FIG. 2, FIG. 4 reveals that the second housing part 24 has a guiding dome 73 for the valve tappet extending into the housing interior as well as a stop 74 for the piston 38, which is formed by the end face of the guiding dome 73.

In the embodiments, the radial bending stiffness of the first housing part 22 in the region of the circumferential rim 30 is distinctly smaller than that of the second housing part 24 in the region of the centering collar 34.

The first housing part 22 has a continuously constant wall thickness, whereas the second housing part 24, which is designed as cast part, has a non-uniform wall thickness.

The invention claimed is:

1. Method for producing an actuator, comprising an outer housing which includes at least one first housing part and one second housing part, wherein the first housing part has an inner side with a running surface for a hydraulically or pneumatically drivable piston coupled with a valve tappet and has a circumferential rim, wherein the second housing part comprises a circumferential centering collar having a radial outside, comprising the steps of
    producing the first housing part by plastic deformation of a metal part due to exertion of outer pressure, and
    attaching the first housing part to the second housing part by mounting the circumferential rim onto the outside of the circumferential centering collar,
    wherein the first housing part has a non-circular shape at the circumferential rim after production and the second housing part has a circular shape at the radial outside of the centering collar, the first housing part being deformed when being shifted onto the circumferential centering collar to adapt its shape to the circular shape of the outside of the circumferential centering collar.

2. The method of claim 1, comprising the step of producing the first housing part by chipless metal forming.

3. The method of claim 1, comprising the step of producing the second housing part by casting.

4. The method of claim 1, wherein the outside of the circumferential centering collar of the second housing part which contacts the first housing part is machined so as to be round.

5. The method according to claim 1, wherein a circumferential wall of the first housing part is generated by the deformation step, the circumferential wall terminating with the circumferential rim, and wherein the circumferential wall has a smaller radial bending stiffness than the second housing part in the region of the centering collar.

6. The method according to claim 1, wherein the running surface is a surface remaining unmachined after forming of the first housing part so that the produced actuator has an unmachined running surface for the piston.

7. The method according to claim 1, comprising the step of flaring a region adjoining the circumferential rim all around, wherein the flare amounts to between 0.01 and 20% of the outside diameter of the first housing part in the region of the running surface.

8. The method according to claim 7, wherein the flare amounts to between 1 and 4% of the outside diameter of the first housing part in the region of the running surface.

9. The method according to claim 1, comprising the step of producing an axial stop at the second housing part and shifting the first housing part onto the second housing part until the circumferential rim axially contacts the axial stop.

10. The method according to claim 1, comprising the step of shifting the first housing part onto the centering collar without clearance and providing a press fit between the first and the second housing parts.

11. The method according to claim 1, comprising the step of one of welding, soldering and gluing the first housing part and the second housing part to each other.

12. The method according to claim 1, wherein the first housing part is formed by one of deep drawing and internal high-pressure forming.

13. The method according to claim 1, wherein the first housing part is formed to have a pot-shape and the second housing part has a central opening to accommodate the valve tappet.

14. The method according to claim 1, wherein the first housing part is formed to have a continuously constant wall thickness.

15. The method according to claim 1, wherein the second housing part has a non-uniform wall thickness.

16. The method according to claim 1, wherein a connecting part for the hydraulic or pneumatic port is inserted in the first housing part and attached to the first housing part by one of welding, soldering and gluing.

17. The method according to claim 1, wherein a separately manufactured supporting element in the form of one of a disk and a ring is inserted into the first housing part in the region of the inside of the end wall.

* * * * *